(12) United States Patent
Singh et al.

(10) Patent No.: US 8,116,761 B1
(45) Date of Patent: Feb. 14, 2012

(54) MODIFYING WIRELESS NETWORK PAGING ZONE BROADCAST BASED ON WIRELESS ACCESS CONGESTION

(75) Inventors: Jasinder Pal Singh, Olathe, KS (US); Sachin R. Vargantwar, Overland Park, KS (US); Manoj Shetty, Overland Park, KS (US); Bhagwan Singh Khanka, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2 days.

(21) Appl. No.: 12/854,666

(22) Filed: Aug. 11, 2010

(51) Int. Cl.
*H04W 4/00* (2009.01)

(52) U.S. Cl. .................. 455/426.1; 455/445; 455/435.1; 370/312; 370/229

(58) Field of Classification Search .................. None
See application file for complete search history.

(56) References Cited

U.S. PATENT DOCUMENTS

| | | | |
|---|---|---|---|
| 5,117,502 A | 5/1992 | Onoda et al. | |
| 5,327,575 A | 7/1994 | Menich et al. | |
| 5,379,446 A | 1/1995 | Murase | |
| 5,379,447 A | 1/1995 | Bonta et al. | |
| 5,483,668 A | 1/1996 | Malkamaki et al. | |
| 5,513,246 A | 4/1996 | Jonsson et al. | |
| 5,621,784 A | 4/1997 | Tiedemann, Jr. et al. | |
| 5,732,352 A | 3/1998 | Gutowski et al. | |
| 5,822,454 A | 10/1998 | Rangarajan | |
| 5,915,219 A | 6/1999 | Poyhonen | |
| 5,953,661 A | 9/1999 | Schwinghammer et al. | |
| 5,991,626 A | 11/1999 | Hinz et al. | |
| 5,995,836 A | 11/1999 | Wijk et al. | |
| 6,295,452 B1 | 9/2001 | Choi | |
| 6,381,458 B1 | 4/2002 | Frodigh et al. | |
| 6,507,740 B2 | 1/2003 | Shi | |
| 6,539,227 B1 | 3/2003 | Jetzek et al. | |
| 6,631,263 B1 | 10/2003 | Corkery | |
| 6,745,034 B2 | 6/2004 | Wang et al. | |
| 6,754,493 B1 | 6/2004 | Jetzek | |
| 6,771,962 B2 | 8/2004 | Saifullah et al. | |
| 6,778,830 B1 | 8/2004 | Oizumi et al. | |
| 7,263,358 B2 | 8/2007 | Chiou | |
| 2003/0216140 A1* | 11/2003 | Chambert | 455/426.1 |
| 2006/0240827 A1 | 10/2006 | Dunn et al. | |
| 2007/0099618 A1 | 5/2007 | Kim | |
| 2008/0014943 A1 | 1/2008 | Ahn et al. | |
| 2008/0091308 A1* | 4/2008 | Henson et al. | 700/293 |
| 2010/0002582 A1* | 1/2010 | Luft et al. | 370/230.1 |

* cited by examiner

*Primary Examiner* — Ajit Patel

(57) ABSTRACT

What is disclosed is a method of operating a wireless access control system. The method includes monitoring a first wireless access node to determine when the first wireless access node experiences wireless access congestion, where the first wireless access node broadcasts a first paging zone identifier for receipt by wireless communication devices receiving wireless access from the first wireless access node. The method also includes, in response to the wireless access congestion at the first wireless access node, instructing a second wireless access node which broadcasts a second paging zone identifier to toggle between broadcasting the first paging zone identifier and broadcasting the second paging zone identifier at a first duty cycle.

20 Claims, 5 Drawing Sheets

MODIFYING WIRELESS NETWORK PAGING ZONE BROADCAST BASED ON WIRELESS ACCESS CONGESTION

TECHNICAL FIELD

Aspects of the disclosure are related to the field of communications, and in particular, broadcasting paging zone identifiers to wireless communication devices in wireless communication networks.

TECHNICAL BACKGROUND

Wireless communication networks typically include multiple wireless access nodes spread over a geographic area through which wireless communication devices can register and receive wireless communication services. In many examples, the wireless communication devices are mobile, and can move between wireless coverage areas of the wireless access nodes. The wireless communication network transfers information to the wireless communication devices to indicate incoming calls, messages, or other alerts. This information, many times referred to as paging information, is routed through the wireless access nodes to reach the wireless communication devices. The wireless access nodes are also typically grouped into paging zones, where delivery of paging information for a particular wireless communication device is transferred only to the paging zone in which that particular wireless communication device is registered.

However, when many wireless communication devices communicate through a wireless access node, congestion can arise and cause difficulty in delivery of the paging information. Wireless access nodes can also experience heavy registration traffic from wireless communication devices, leading to slower response times and dropped or blocked communication sessions.

OVERVIEW

What is disclosed is a method of operating a wireless access control system. The method includes monitoring a first wireless access node to determine when the first wireless access node experiences wireless access congestion, where the first wireless access node broadcasts a first paging zone identifier for receipt by wireless communication devices receiving wireless access from the first wireless access node. The method also includes, in response to the wireless access congestion at the first wireless access node, instructing a second wireless access node which broadcasts a second paging zone identifier to toggle between broadcasting the first paging zone identifier and broadcasting the second paging zone identifier at a first duty cycle.

What is also disclosed is a wireless access control system. The wireless access control system includes a processing system and a control interface. The processing system is configured to monitor a first wireless access node to determine when the first wireless access node experiences wireless access congestion, where the first wireless access node broadcasts a first paging zone identifier for receipt by wireless communication devices receiving wireless access from the first wireless access node. In response to the wireless access congestion at the first wireless access node, a control interface is configured to instruct a second wireless access node which broadcasts a second paging zone identifier to toggle between broadcasting the first paging zone identifier and broadcasting the second paging zone identifier at a first duty cycle.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
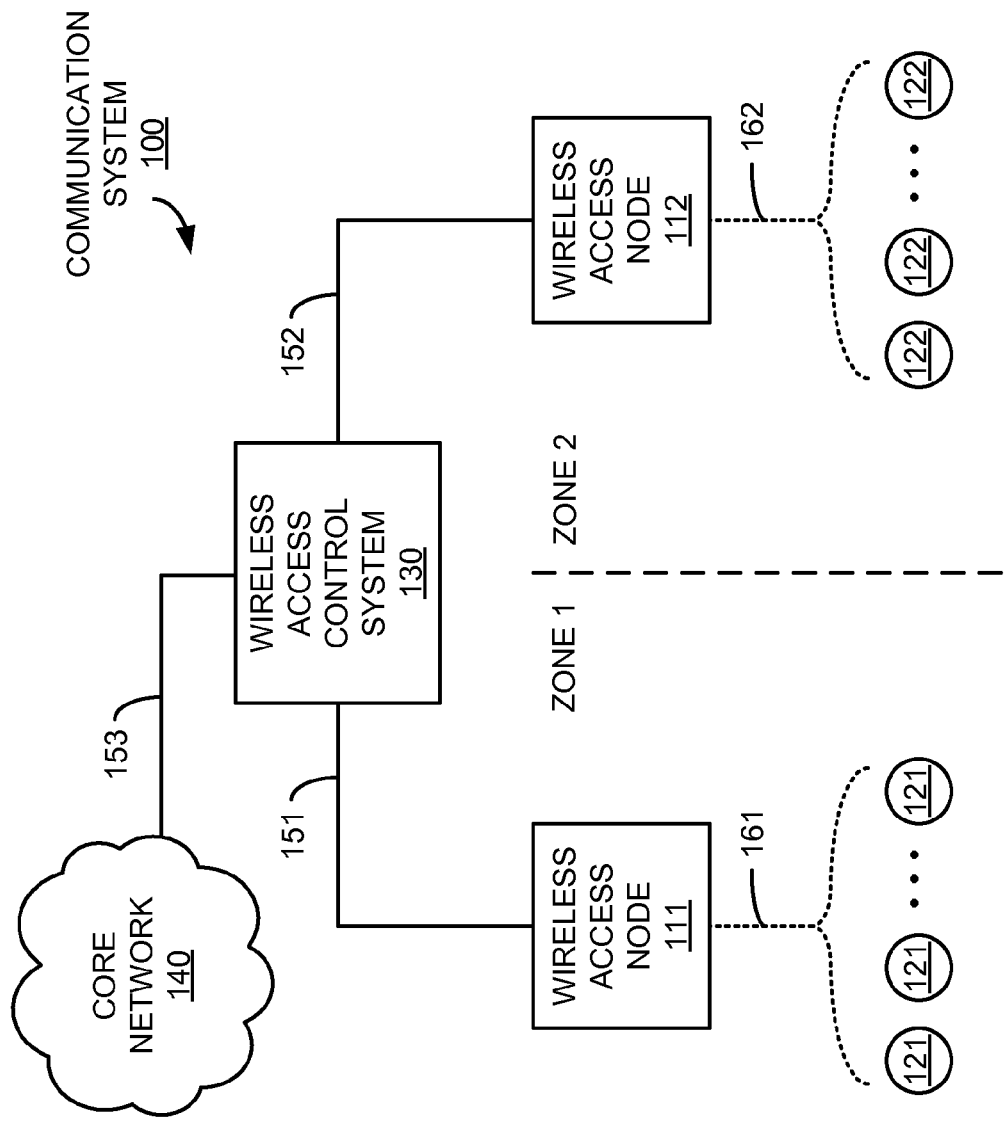
FIG. 1 is a system diagram illustrating a communication system.

FIG. 1 is a system diagram illustrating communication system 100. Communication system 100 includes wireless access nodes 111-112, wireless communication devices 121-122, wireless access control system 130, and core network 140. Wireless access node 111 and wireless communication devices 121 communicate over wireless link 161. Wireless access node 112 and wireless communication devices 122 communicate over wireless link 162. Wireless access control system 130 and wireless access nodes 111-112 communicate over links 151-152, respectively. Wireless access control system 130 and core network 140 communicate over link 153.

In FIG. 1, wireless communication devices 121 receive wireless access for communication services from wireless access node 111, and wireless communication devices 122 receive wireless access for communication services from wireless access node 112. In this example, the communication services could include services provided by core network 140 or other systems, such as voice calls, data exchange, Internet access, text messaging, among other services. Each of wireless access nodes 111-112 wirelessly exchange user and overhead communications with the associated wireless communication devices, as well as communicate with wireless access control system 130 or other systems. Although a single wireless link 161 is shown for wireless communication devices 121 and a single wireless link 162 is shown for wireless communication devices 121, it should be understood that wireless links 161-162 are merely representative of communication with a plurality of wireless communication devices over wireless links, and a different configuration, such as individual wireless links, could also be shown in FIG. 1.

Figure 2:
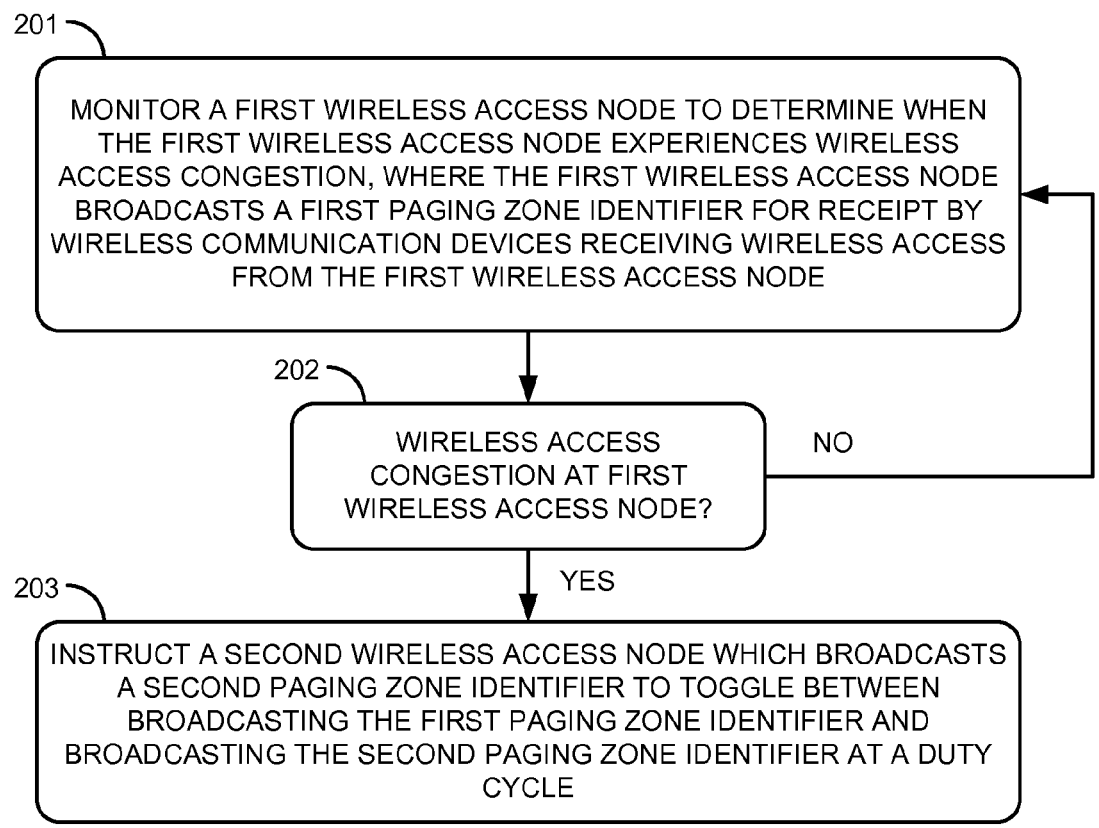
FIG. 2 is a flow diagram illustrating a method of operation of a wireless access control system.

FIG. 2 is a flow diagram illustrating a method of operation of a wireless access control system, such as wireless access control system 130 of FIG. 1. The operations of FIG. 2 are referenced herein parenthetically. Wireless access node 111 initially broadcasts a paging zone identifier for paging zone 1 for receipt by wireless communication devices 121. Wireless access node 112 initially broadcasts a paging zone identifier for paging zone 2 for receipt by wireless communication devices 122. A paging zone identifier is a number, designator, or other representation which indicates a paging zone into which a wireless access node is grouped. Wireless access nodes can be grouped into different zones for delivery of paging information. This grouping can be done to allow a page control system to route a subset of all paging information to different zones, thus reducing the amount of total paging traffic across a wireless communication network. In typical examples, many wireless access nodes are included in a paging zone. The paging zones could be determined by a quantity of wireless access nodes per zone, geography, wireless coverage area limitations, or other factors, including combinations thereof. In the example shown in FIG. 1, "zone 1" initially includes wireless access node 111 while "zone 2" initially includes wireless access node 112. It should be understood that a different configuration or number of wireless access nodes in each zone could be employed.

In typical examples, paging information is transferred to wireless communication devices in communication system 100. This paging information, sometimes referred to as pages, can indicate incoming calls, messages, network alerts, voice call alerts, text messages, audio messages, or other information, including combinations thereof. This paging information is typically routed by a page control system through wireless access nodes for delivery to the wireless communication devices communicating therewith. A page control system could receive pages from core network 140, could be generated from within a page control system, or could be generated due to activity of other wireless communication devices or wireless access nodes within communication system 100. Wireless access control system 130 could include a page control system.

In FIG. 2, wireless access control system 130 monitors (201) wireless access node 111 to determine when wireless access node 111 experiences wireless access congestion. The wireless access congestion could be based upon a utilization level of the wireless access resources of wireless access node 111, such as when access channel utilization exceeds a utilization threshold, when a predetermined amount of wireless communication devices are within a coverage area of wireless access node 111, a level of communication traffic handled by wireless access node 111, a number of wireless communication devices seeking to register for wireless access through wireless access node 111, a number of wireless communication devices presently registered for communication service through wireless access node 111, an amount of available data, voice call, or overhead communications capacity of wireless access node 111, among other metrics of wireless access congestion. The wireless access congestion could include determining if a time of day, a calendar event, or other time-based indicator indicates a predetermined time or event, which may indicate a present congestion event. The wireless access congestion could include processing past monitoring of wireless congestion or future predictions to determine present wireless congestion.

If wireless access congestion exists (202) at wireless access node 111, then wireless access control system 130 instructs (203) wireless access node 112 which broadcasts a paging zone identifier for paging zone 2 to toggle between broadcasting the paging zone identifier for paging zone 1 and broadcasting the paging zone identifier for paging zone 2 at a duty cycle. In this example, the duty cycle is a transition at a periodic cycle between broadcasting the paging zone identifier for paging zone 1 and broadcasting the paging zone identifier for paging zone 2. The duty cycle could be based upon a predetermined duty cycle, such as a 50% duty cycle, among other predetermined values, or could be based upon other factors. Other factors could include examples where wireless access node 111 and wireless access node 112 are located along a roadway carrying vehicle traffic, and where the duty cycle corresponds to an average speed of the vehicle traffic along the roadway or where the duty cycle corresponds to a volume level of the vehicle traffic along the roadway.

Figure 3:
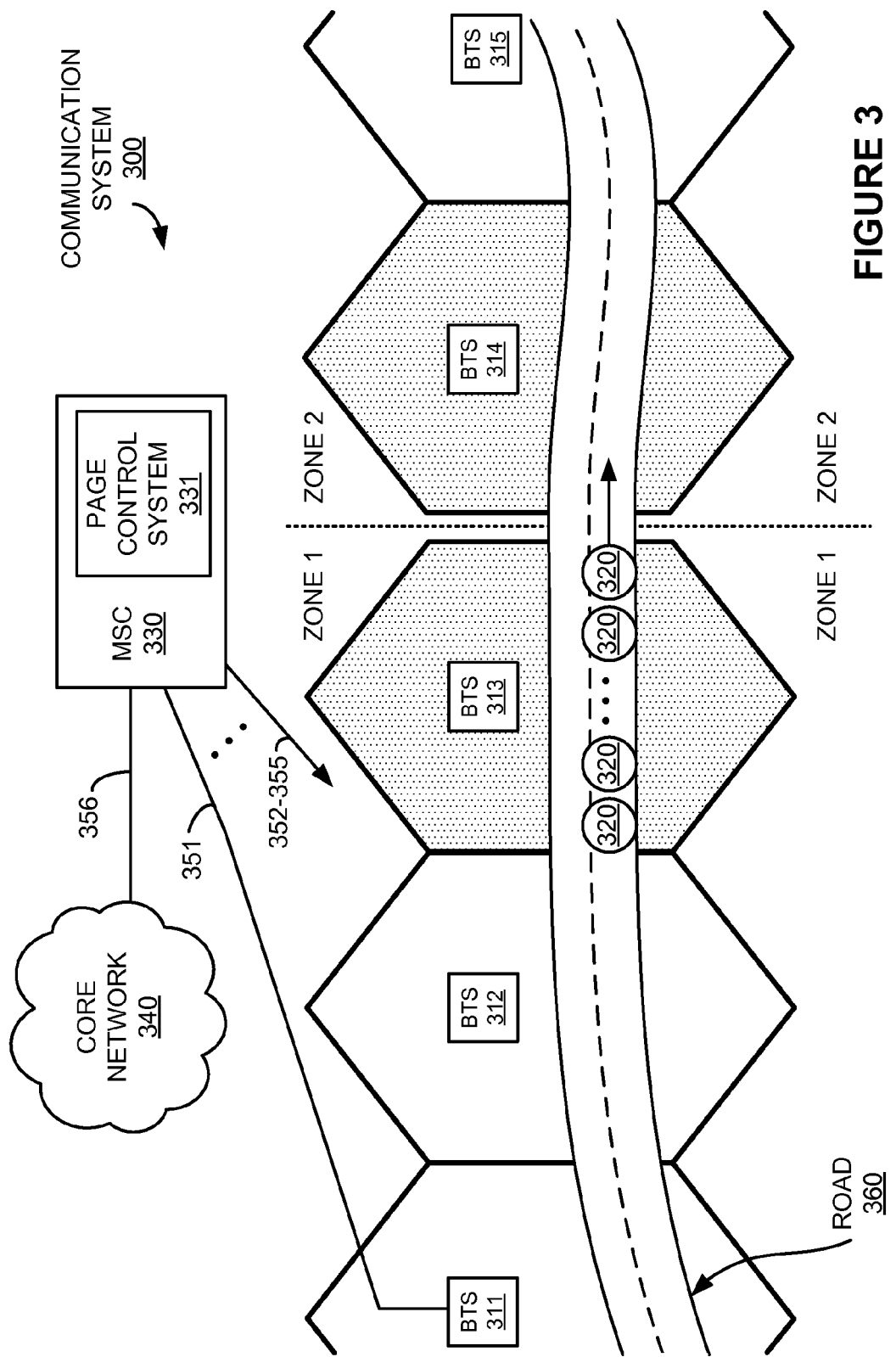
FIG. 3 is a system diagram illustrating a communication system.

FIG. 3 is a system diagram illustrating communication system 300. Communication system 300 includes base transceiver stations (BTS) 311-315, wireless communication devices 320, mobile switching center (MSC) 330, and core network 340. MSC 330 and base transceiver stations 311-315 communicate over backhaul links 351-355, respectively. In this example, backhaul links 351-355 are T1 links. MSC 330 and core network 340 communicate over link 356. In this example, link 356 is a metropolitan area network (MAN) optical communication link.

In FIG. 3, base transceiver stations 311-315 are positioned along road 360. Wireless communication devices 320, such as mobile phones, are located in vehicles traveling to the right along road 360, although different configurations could be employed. As shown in FIG. 3, base transceiver stations 311-315 each have a limited geographic range over which they can provide communication services to wireless communication devices. The limited range over which each base transceiver stations 311-315 can support communications with wireless communication devices is indicated by hexagonal-shaped coverage areas in FIG. 3. Although a hexagonal region defining each coverage area is shown in FIG. 3, it should be understood that the coverage areas could be of other shapes and configurations, as determined by geographic features, empirical data, the equipment of base transceiver stations 311-315, or by other factors, including combinations thereof. Each hexagonal coverage area of base transceiver stations 311-315 could be further divided into sectors, where a sector can represent a particular region of wireless coverage, typically served by a single antenna, antenna array, or base transceiver station of a wireless access node. Further base transceiver station equipment could be included in base transceiver stations 311-315 in examples where sectors are employed. In many examples, there are multiple sectors associated with a single wireless access node, antenna tower, or base station, with each sector describing a slice of the surrounding geographic region serviced by a base transceiver station.

Figure 4:
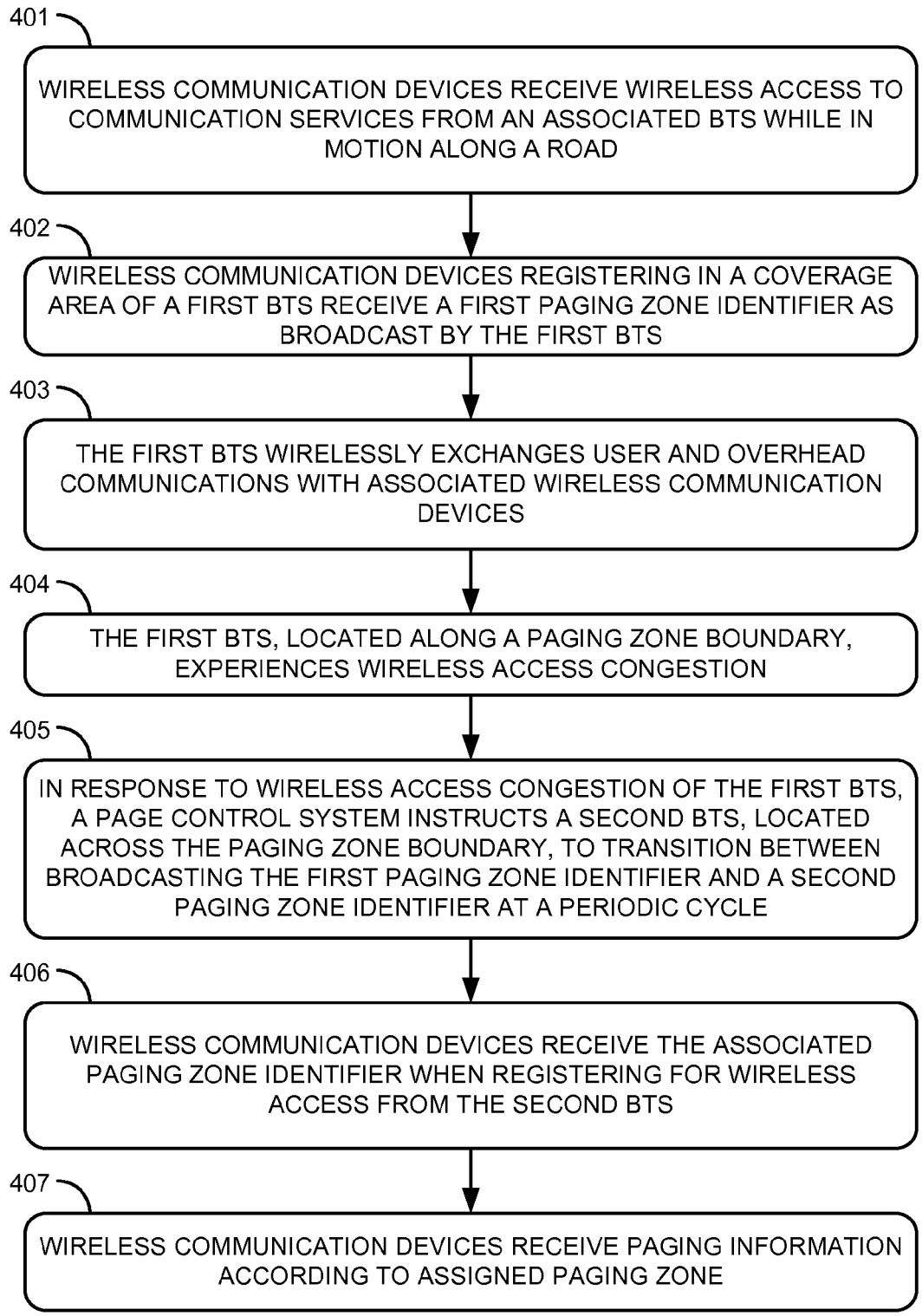
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, wireless communication devices 320 each receive (401) wireless access to communication services from an associated base transceiver station as they each travel along road 360. Wireless links between wireless communication devices 320 and each associated base transceiver station are not shown in FIG. 3 for clarity.

Wireless communication devices 320 registering in a coverage area of BTS 313 receive (402) a first paging zone identifier as broadcast by BTS 313. Some of wireless communication devices 320 may be registered for wireless access through others of BTS 311-315 before entering the wireless coverage area of BTS 313, and a handoff may occur from the previous BTS to BTS 313. As a part of the registration with BTS 313, wireless communication devices receive the first paging zone identifier as broadcast by BTS 313. In this example, each of BTS 311-315 receives a paging zone assignment from page control system 331 in MSC 330 over backhaul links 351-355, respectively. Each wireless communication device registered for communication service with BTS 313 then reports the paging zone identifier that is broadcast by BTS 313 to paging control system 331.

BTS 313 wirelessly exchanges (403) user and overhead communications with the associated registered wireless communication devices. The user communications could include voice calls, user data, Internet access, email, or other user communications. The overhead communications could include access or system parameter messages, resource assignments, paging information, text messages, or other overhead communications. Paging information, such as pages, are received or generated by page control system 331 of MSC 330. These pages are then routed for delivery to the appropriate wireless communication devices. Page control system 331 includes a listing of the paging zone identifiers that each of wireless communication devices 320, as registered for communication service with any of BTS 311-315, has reported to page control system 331, as in operation 402. In this example, pages are only routed for delivery to the paging zone in which the recipient wireless communication devices are presently located. For example, pages intended for wireless communication devices registered in paging zone 1 are only transferred for delivery to wireless communication devices reporting paging zone 1.

BTS 313 then experiences (404) wireless access congestion. In this example, BTS 313 is located along a paging zone boundary. A paging zone boundary typically comprises a boundary between a first paging zone associated with a first paging zone identifier and a second paging zone associated with a second paging zone identifier. Also in this example, a direction of travel of the wireless communication devices 320 receiving wireless access from BTS 313 indicates travel across the paging zone boundary, as shown by the right arrow for wireless communication devices 320. The wireless access congestion in this example occurs when a utilization level of the wireless access resources of BTS 313 increases past a predetermined threshold. As shown in FIG. 3, many wireless communication devices 320 have traveled into the coverage area of BTS 313, perhaps due to rush hour vehicle traffic conditions, and have increased the utilization level of the wireless access resources of BTS 313. The wireless access resources could include access channel availability or utilization, where the access channels are provided over a frequency, timeslot, or modulation in a wireless link for wireless communication devices to exchange communications through BTS 313.

The wireless access congestion could also be based upon other factors, such as when a predetermined amount of wireless communication devices are within a coverage area of BTS 313, a level of communication traffic handled by BTS 313, a number of wireless communication devices seeking to register for wireless access through BTS 313, a number of wireless communication devices presently registered for communication service through BTS 313, an amount of available data, voice call, or overhead communications capacity of BTS 313, among other metrics of wireless access congestion. The wireless access congestion could include determining if a time of day, a calendar event, or other time-based indicator indicates a predetermined time or event, which may indicate a present congestion event, such as during rush hour events or sporting events. The wireless access congestion could include processing past monitoring of wireless congestion or future predictions to determine present wireless congestion.

In response to wireless access congestion of BTS 313, page control system 331 instructs (405) a second BTS, located across the paging zone boundary, to transition between broadcasting the first paging zone identifier and a second paging zone identifier at a periodic cycle. As shown in FIG. 3, "zone 1" and "zone 2" form a paging zone boundary, indicated by the vertical dotted line. As discussed above, BTS 313 is adjacent to the paging zone boundary and adjacent to BTS 314 across the paging zone boundary. Initially, BTS 313 broadcasts a first paging zone identifier for "zone 1" and BTS 314 broadcasts a second paging zone identifier for "zone 2." Also in this example, a direction of travel of the wireless communication devices 320 receiving wireless access from BTS 313 indicates travel across the paging zone boundary, as shown by the right arrow associated with wireless communication devices 320. Page control system 331 can anticipate possible congestion at BTS 314, and instruct BTS 314 to help reduce the possible congestion. In this example, the periodic cycle is a repeated transition between broadcasting the paging zone identifier for paging zone 1 and broadcasting the paging zone identifier for paging zone 2, such as at a duty cycle. In some examples, only one paging zone identifier is broadcast at any particular time, although in other examples, both the first and second paging zone identifiers could be broadcast concurrently for a period of time by BTS 314. In yet further examples, BTS 313 could also be instructed by page control system 331 to transition between broadcasting the first paging zone identifier and a second paging zone identifier at a periodic cycle. In examples where both BTS 313 and BTS 314 both transition between broadcasting the first paging zone identifier and a second paging zone identifier at periodic cycles, the periodic cycles could be varied for each BTS. For example, the transitions could be scheduled for different paging zone identifiers at adjacent base transceiver stations so a BTS does not broadcast the same paging zone identifier as an adjacent BTS during a periodic cycle. Overlapping time periods could also be employed. The periodic cycles could be based upon a predetermined duty cycle, such as a 50% duty cycle, among other predetermined values, or could be based upon other factors. Other factors could include examples where a duty cycle or transition rate corresponds to an average speed of the vehicle traffic along the roadway or a volume level of the vehicle traffic along the roadway. For example, a higher average speed of the vehicle traffic could correspond to broadcasting the second paging zone identifier at BTS 314 for a shorter period of time. As a further example, a high volume level of vehicle traffic could correspond to a longer broadcast period for the first paging zone identifier at BTS 314. Different time periods and associations with vehicle speeds or volumes could be employed.

Wireless communication devices receive (406) the associated paging zone identifier when registering for wireless access from BTS 314. As a part of the registration with BTS 314, wireless communication devices receive the associated paging zone identifier as broadcast by BTS 314. However, since BTS 314 transitions between broadcasting the first paging zone identifier and the second paging zone identifier at a periodic cycle, as individual wireless communication devices register for wireless access with BTS 314, a varying paging zone identifier is received by the individual wireless communication devices. In some instances, the same paging zone identifier as initially received from BTS 313 will be received by a wireless communication device registering for subsequent wireless access from BTS 314, while in other instances a different paging zone identifier than initially received from BTS 313 will be received from BTS 314. Wireless communication devices registering for communication service with BTS 314 then only report a paging zone assignment to paging control system 331 if a change in paging zone identifier is received. Since only a portion of wireless communication devices 320 enter the coverage area of BTS 314 at any given time, due to the motion of the associated vehicle traffic along road 360, communication traffic at BTS 314 is reduced as paging zone assignment reporting, among other communication traffic, is reduced.

Wireless communication devices 320 receive (407) paging information according to the assigned paging zone. In operation, paging information, such as pages, are received or generated by page control system 331 of MSC 330 for delivery to specific wireless communication devices. These pages are then routed for delivery to the appropriate wireless communication devices. As discussed above, page control system 331 includes a listing of the paging zone identifiers that each of wireless communication devices 320 has reported to page control system 331. In this example, pages are only routed for delivery through wireless access nodes in the paging zone in which the recipient wireless communication devices are presently located. For example, pages intended for wireless communication devices registered in paging zone 1 are only transferred for delivery to wireless access nodes where wireless communication devices have reported paging zone 1.

Figure 5:
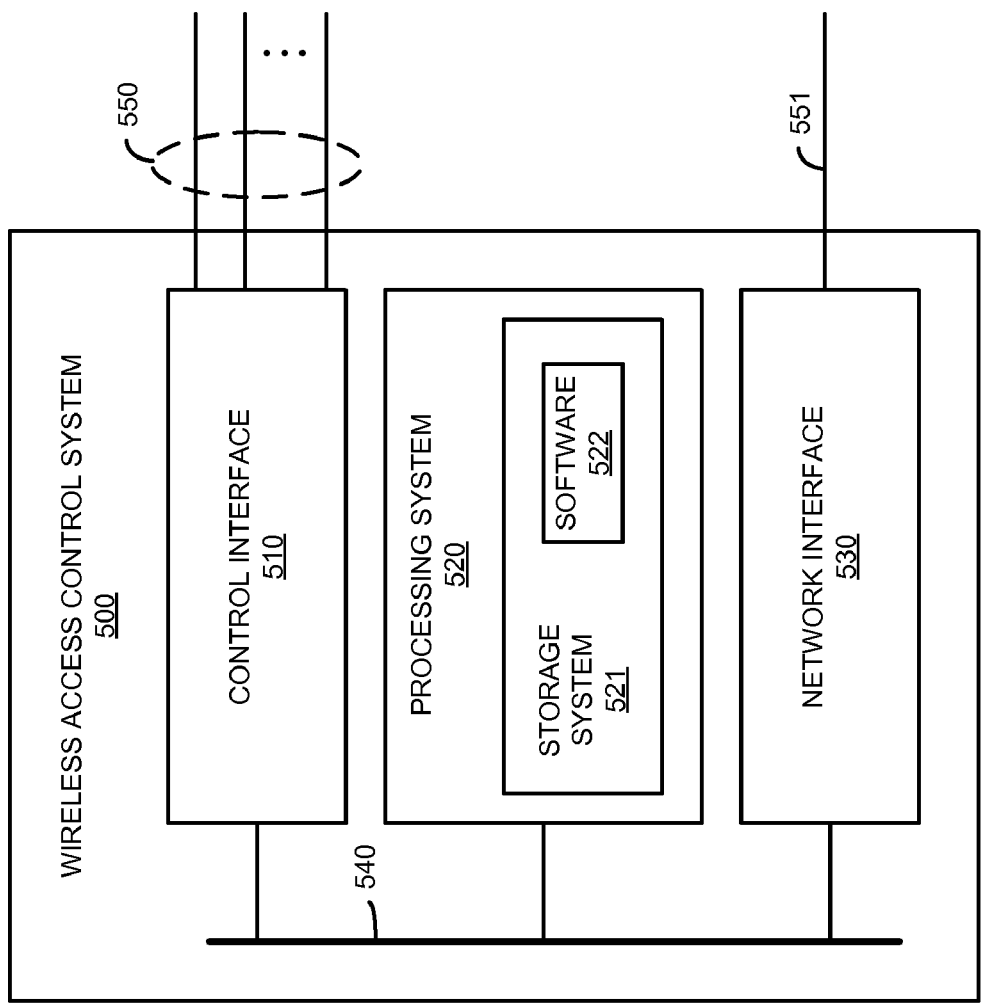
FIG. 5 is a block diagram illustrating a wireless access control system.

FIG. 5 is a block diagram illustrating wireless access control system 500, as an example of wireless access control system 130 found in FIG. 1, or MSC 330 found in FIG. 3, although wireless access control system 130 or MSC 330 could use other configurations. Wireless access control system 500 includes control interface 510, processing system 520, and network interface 530. Control interface 510, processing system 520, and network interface 530 communicate over bus 540. Wireless access control system 500 may be distributed among multiple devices that together form elements 510, 520-522, 530, 540, and 550-551.

Control interface 510 comprises communication interfaces for communicating with and controlling the operations of wireless access nodes, such as base stations, over links 550. Control interface 510 also receives command and control information from processing system 520 or network interface 530 for controlling the operations of wireless access nodes over links 550, instructing wireless access nodes on which paging zone identifiers to broadcast and duty cycles of the paging zone identifiers, among other operations. Links 550 could each use various protocols or communication formats as described herein for links 151-152 or links 351-355, including combinations, variations, or improvements thereof.

Processing system 520 includes storage system 521. Processing system 520 retrieves and executes software 522 from storage system 521. In some examples, processing system 520 is located within the same equipment in which control interface 510 or network interface 530 are located. In further examples, processing system 520 comprises specialized circuitry, and software 522 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs processing system 520 to operate as described herein, such as determining paging zone identifiers for wireless access nodes to broadcast, and determining duty cycles of the paging zone identifier broadcasts, among other operations.

Network interface 530 comprises network router and gateway equipment for communicating with a core network of a wireless communication provider, such as with core network 140 or core network 340. Network interface 530 exchanges user communications and overhead communications with a core network of a wireless communication system over link 551. Link 551 could use various protocols or communication formats as described herein for link 153 or 356, including combinations, variations, or improvements thereof.

Bus 540 comprises a physical, logical, or virtual communication link, capable of communicating data, control signals, power, and communications, along with other information. In some examples, bus 540 is encapsulated within the elements of control interface 510, processing system 520, or network interface 530, and may be a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

Referring back to FIG. 1, wireless communication devices 121-122 each comprise radio frequency (RF) communication circuitry and antenna elements. The RF communication circuitry typically includes amplifiers, filters, modulators, and signal processing circuitry. In many examples, wireless communication devices 121-122 each include circuitry and equipment to exchange communications of wireless communication services over wireless links with wireless access systems, request communication services, and receive control information from wireless access nodes, among other operations. Wireless communication devices 121-122 may also each include user interface systems, memory devices, computer-readable storage mediums, software, processing circuitry, or other communication components. Each of wireless communication devices 121-122 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although a number of representative wireless communication devices are shown in FIG. 1, it should be understood that a different number of wireless communication devices could be shown.

Wireless access nodes 111-112 each comprise RF communication and control circuitry, antenna elements, and communication routing equipment and systems. The RF communication circuitry typically includes amplifiers, filters, RF modulators, transceivers, and signal processing circuitry. In many examples, wireless access nodes 111-112 each include equipment to provide wireless access to communication services within a coverage area to user devices such as wireless communication devices 121-122 shown in FIG. 1, route user communications between core network 140 and wireless communication devices, broadcast paging zone identifiers, transfer paging information, provide network information, handoff information, or configuration information to wireless communication devices, among other operations. Wireless access nodes 111-112 may also each comprise data modems, routers, servers, memory devices, software, processing systems, cabling, network communication interfaces, physical structural supports, or other communication apparatuses. Wireless access nodes 111-112 may also each comprise base stations, base transceiver stations (BTS), base station controllers (BSC), or other communication equipment and apparatuses.

Wireless access control system 330 includes network equipment capable of transferring pages for delivery to wireless communication devices through wireless access nodes, as well as processing systems to analyze congestion of wireless access nodes. Examples of wireless access control system 330 include radio node controllers (RNC), mobile switching centers (MSC), call processing equipment, telephone switches, routers, gateways, computer processing equipment, microprocessors, as well as other type of communication and processing equipment, including combinations thereof.

Core network 140 could include further wireless access nodes, base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other communication systems, including combinations thereof. Core network 140 may also comprise optical networks, asynchronous transfer mode (ATM) networks, packet networks, metropolitan-area networks (MAN), Internet systems, or other network topologies, equipment, or systems, including combinations thereof. In typical examples, core network 140 includes many wireless access systems and associated equipment for providing communication services to many user devices across a geographic region.

Wireless links 161-162 each use the air or space as the transport media. Wireless links 161-162 may each use various protocols, such as Code Division Multiple Access (CDMA), Evolution-Data Optimized (EV-DO), single-carrier radio transmission technology link (1×RTT), Worldwide Interoperability for Microwave Access (WIMAX), Global System for Mobile Communication (GSM), Universal Mobile Telecommunications System (UMTS), Long Term Evolution (LTE), Wireless Fidelity (WiFi), High Speed Packet Access (HSPA), Radio Link Protocol (RLP), or some other wireless communication format, including combinations, improvements, or variations thereof. Although two wireless links 161-162 are shown in FIG. 1, it should be understood that each wireless link is merely illustrative to show associated communications with wireless access nodes 111-112.

Communication links 151-153 each use metal, glass, optical, air, space, or some other material as the transport media. Communication links 151-153 could each use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication links 151-153 could each be a direct link or may include intermediate networks, systems, or devices.

Links 151-153 and 161-162 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access control system, comprising:
    monitoring a first wireless access node to determine when the first wireless access node experiences wireless access congestion, wherein the first wireless access node broadcasts a first paging zone identifier for first paging zone for receipt by wireless communication devices receiving wireless access from the first wireless access node;
    in response to the wireless access congestion at the first wireless access node, instructing a second wireless access node which broadcasts a second paging zone identifier for second paging zone to toggle between broadcasting the first paging zone identifier for first paging zone and broadcasting the second paging zone identifier for second paging zone at a first duty cycle.

2. The method of claim 1, wherein the first wireless access node is located across a paging zone boundary from the second wireless access node, wherein the paging zone boundary comprises a boundary between a first paging zone associated with the first paging zone identifier and a second paging zone associated with the second paging zone identifier.

3. The method of claim 2, wherein the first wireless access node experiences wireless access congestion when a direction of travel of the wireless communication devices receiving the wireless access from the first wireless access node indicates travel across the paging zone boundary.

4. The method of claim 1, wherein the first wireless access node experiences wireless access congestion when access channel utilization of the first wireless access node exceeds a utilization threshold.

5. The method of claim 1, wherein the first wireless access node experiences wireless access congestion when a predetermined time of day occurs.

6. The method of claim 1, wherein the first wireless access node experiences wireless access congestion when a predetermined amount of wireless communication devices are within a coverage area of the first wireless access node.

7. The method of claim 1, wherein the first wireless access node experiences wireless access congestion when a congestion history of the first wireless access node indicates a present congestion event for the first wireless access node.

8. The method of claim 1, wherein the first wireless access node and the second wireless access node are located along a roadway carrying vehicle traffic, and wherein the first duty cycle corresponds to an average speed of the vehicle traffic along the roadway.

9. The method of claim 1, wherein the first wireless access node and the second wireless access node are located along a roadway carrying vehicle traffic, and wherein the first duty cycle corresponds to a volume level of the vehicle traffic along the roadway.

10. The method of claim 1, wherein the first duty cycle comprises a 50% duty cycle.

11. A wireless access control system, comprising:
    a processing system configured to monitor a first wireless access node to determine when the first wireless access node experiences wireless access congestion, wherein the first wireless access node broadcasts a first paging zone identifier for first paging zone for receipt by wireless communication devices receiving wireless access from the first wireless access node;
    in response to the wireless access congestion at the first wireless access node, a control interface configured to instruct a second wireless access node which broadcasts a second paging zone identifier for second paging zone to toggle between broadcasting the first paging zone identifier for first paging zone and broadcasting the second paging zone identifier for second paging zone at a first duty cycle.

12. The wireless access control system of claim 11, wherein the first wireless access node is located across a paging zone boundary from the second wireless access node, wherein the paging zone boundary comprises a boundary between a first paging zone associated with the first paging zone identifier and a second paging zone associated with the second paging zone identifier.

13. The wireless access control system of claim 12, wherein the first wireless access node experiences wireless access congestion when a direction of travel of the wireless communication devices receiving the wireless access from the first wireless access node indicates travel across the paging zone boundary.

14. The wireless access control system of claim 11, wherein the first wireless access node experiences wireless access congestion when access channel utilization of the first wireless access node exceeds a utilization threshold.

15. The wireless access control system of claim 11, wherein the first wireless access node experiences wireless access congestion when a predetermined time of day occurs.

16. The wireless access control system of claim 11, wherein the first wireless access node experiences wireless access congestion when a predetermined amount of wireless communication devices are within a coverage area of the first wireless access node.

17. The wireless access control system of claim 11, wherein the first wireless access node experiences wireless access congestion when a congestion history of the first wireless access node indicates a present congestion event for the first wireless access node.

18. The wireless access control system of claim 11, wherein the first wireless access node and the second wireless access node are located along a roadway carrying vehicle traffic, and wherein the first duty cycle corresponds to an average speed of the vehicle traffic along the roadway.

19. The wireless access control system of claim 11, wherein the first wireless access node and the second wireless access node are located along a roadway carrying vehicle traffic, and wherein the first duty cycle corresponds to a volume level of the vehicle traffic along the roadway.

20. The wireless access control system of claim 11, wherein the first duty cycle comprises a 50% duty cycle.

* * * * *